United States Patent [19]

Blount

[11] 4,317,752

[45] * Mar. 2, 1982

[54] PROCESS FOR THE PRODUCTION OF POLYISOCYANATE LIGNIN-CELLULOSE PLASTICS

[76] Inventor: David H. Blount, 5450 Lea St., San Diego, Calif. 92105

[*] Notice: The portion of the term of this patent subsequent to Oct. 7, 1997, has been disclaimed.

[21] Appl. No.: 185,397

[22] Filed: Sep. 8, 1980

Related U.S. Application Data

[63] Continuation-in-part of Ser. No. 13,139, Feb. 21, 1979, Pat. No. 4,226,982.

[51] Int. Cl.³ .......................... C08G 18/02; C08J 9/02; C08L 1/00
[52] U.S. Cl. ...................................... 521/159; 521/84; 521/125; 521/130; 521/175; 528/44; 528/85
[58] Field of Search .................. 260/9, 17.4 CL, 17.2, 260/17.3, 17.4 R; 521/84, 125, 130, 175; 528/44, 85

[56] References Cited

U.S. PATENT DOCUMENTS

| | | | |
|---|---|---|---|
| 4,153,764 | 5/1979 | Blount | 521/155 |
| 4,153,768 | 5/1979 | Blount | 521/155 |
| 4,170,697 | 10/1979 | Blount | 521/82 |
| 4,220,757 | 9/1980 | Blount | 528/425 |
| 4,226,982 | 10/1980 | Blount | 536/101 |
| 4,246,819 | 1/1981 | Dahms | 83/582 |

*Primary Examiner*—Ronald W. Griffin

[57] ABSTRACT

This invention relates to a process for preparing polyisocyanate lignin-cellulose plastics by reaction of a lignin-cellulose polymer with a compound having at least two isocyanate groups to produce a lignin-cellulose polyisocyanate prepolymer. The prepolymer is then reacted with an organic compound to produce a polyisocyanate cellulose plastic.

20 Claims, No Drawings

PROCESS FOR THE PRODUCTION OF POLYISOCYANATE LIGNIN-CELLULOSE PLASTICS

CROSS-REFERENCE TO RELATED APPLICATIONS

This application is a continuation in-part of my earlier U.S. Patent Application, Ser. No. 013,139, filed Feb. 21, 1979 now U.S. Pat. No. 4,226,982, issued Oct. 7, 1980.

BACKGROUND OF THE INVENTION

This invention relates to a process for the production of polyisocyanate lignin-cellulose plastic utilizing a broken-down alkali metal lignin-cellulose polymer, an organic compound having at least two isocyanate groups, an organic amphiphilous compound and a curing agent and/or activator.

The products produced by this invention have many commercial uses and may be utilized as thermal-insulating material, noise-insulating material, floatation materials in boats, shock-resistant packaging, cushions, as fiber, as coating agents, as fillers, as impregnating agents, as adhesives, as casting material, as putty materials, as caulking materials, as constructional components of a building, etc. The products are novel, economical, possess improved heat- and flame-resistant properties and some have wood-like physical properties. The products may be produced by spraying or mixing in place.

In the process according to the invention, at least 3 components are used to produce the novel polyisocyanate cellulose plastics as follows:

1. Component A: A broken-down alkali metal lignin-cellulose polymer;
2. Component B: An organic polyisocyanate or polyisocyanate;
3. Component C: An amphiphilous organic compound;
4. Component D: Optionally, a curing agent and/or activator.

Component A

Component A, a broken-down alkali metal lignin-cellulose polymer, is produced by the processes outlined in my copending U.S. Patent Application, Ser. No. 013,139, filed Feb. 21, 1979, and is incorporated into this invention.

Broken-down alkali metal lignin-cellulose polymers are produced by mixing 3 parts by weight of a cellulose-containing plant or plant derivative and 2 to 5 parts by weight of an alkali metal hydroxide, then heating the mixture at 150° C. to 220° C. while agitating for 5 to 60 minutes.

Any suitable plant or the products of plants which contain cellulose may be used in this invention. The plant material is preferred to be in the form of small dry particles such as sawdust. Suitable plants include, but are not limited to, trees, bushes, agricultural plants, weeds, straw, vines, flowers, kelp, algae and mixtures thereof. Wood is the preferred plant. Commercial and agricultural waste products may be used, such as stalks, paper, cotton cloths, bagasse, etc. Plants that have been partially decomposed, such as humus, peat, certain soft brown coal, manure containing cellulose, etc., may also be used in this invention.

Any suitable alkali metal hydroxide may be used in this invention. Suitable alkali metal hydroxides include sodium hydroxide, potassium hydroxide and mixtures thereof. Sodium hydroxide is the preferred alkali metal hydroxide.

The broken-down alkali metal lignin-cellulose polymers are produced by mixing about 3 parts by weight of a cellulose-containing plant in the form of small particles and 2 to 5 parts by weight of an alkali metal hydroxide. The mixture is then heated to 150° C. to 220° C. while agitating for 5 to 60 minutes, thereby producing a water-soluble broken-down alkali metal lignin-cellulose product. The broken-down alkali metal lignin-cellulose polymer is ground into small particles or powder. Care must be taken to avoid having the mixture catch on fire. Sodium hydroxide is the preferred alkali metal hydroxide. Wood is the preferred plant.

Any unreacted plant particles may be used as a filler.

The broken-down alkali metal lignin-cellulose polymer utilized in this invention is a novel polymer and is different than any of the known alkali metal cellulose polymers. This polymer has lost a carbon dioxide per molecule of the broken-down alkali metal lignin-cellulose polymer and is water soluble. The lignin-cellulose bond appears to be intact. When an acid compound is added to an aqueous solution of the broken-down alkali metal lignin-cellulose until the pH is 5 to 6, the lignin-cellulose polymer polymerizes into a tough, brown resinous product which floats to the top while a carbohydrate portion remains in the water. Carbon dioxide gas is given off in the reaction.

Component B

Any suitable polyisocyanate or polyisothiocyanate may be used in this invention, including aliphatic, cycloaliphatic, araliphatic, aromatic and heterocyclic polyisocyanates and mixtures thereof, such as, for example, arylene polyisocyanates such as tolylene; metaphenylene; 4-chlorophenylene-1,3; methylene-bis(phenylene-4); biphenylene-4,4'; 3,3'-dimethoxybiphenylene-4,4'; 3,3'-diphenylbiphenylene-4,4'; naphthalene-1,5; and tertrahydronaphthalene-1,5-diisocyanate and triphenylmethane triisocyanate; alkylene polyisocyanates such as ethylene; ethylidine; propylene-1,2; butylene-1,4; butylene-1,4; butylene-1,3; hexylene-1,6; decamethylene-1,10; cyclohexylene-1,2; cyclohexylene-1,4; and methylene-bis (cyclohexyl-4,4) diisocyanates. Phosgenation products of aniline-formaldehyde condensation may be used, such as polyphenyl-polymethylene polyisocyanates. Polyisothiocyanates, inorganic polyisothiocyanates, polyisocyanates which contain carbodiimide groups as described in German Pat. No. 1,092,007 and polyisocyanates which contain urethane groups, allophanate groups, isocyanurate groups, urea groups, imide groups or biuret groups may be used to produce polyisocyanate silicate prepolymers or polyisocyanate organic silicate solid or cellular solid products. Mixtures of the above-mentioned polyisocyanates may be used.

It is generally preferred to use commercial, readily available polyisocyanates such as toluene-2,4- and -2,6-diisocyanate and any mixtures of these isomers, ("TDI"), ("crude MDI"), polyphenyl-polymethylene-isocyanates obtained by aniline-formaldehyde condensation followed by phosgenation, and modified polyisocyanates which contain carbondiimide groups, urethane groups, allophanate groups, isocyanurate groups, urea groups, imide groups or biuret groups ("modified polyisocyanates") and mixtures thereof.

Other polyisocyanates may be used in this invention, such as polyisocyanates which contain ester groups such as those listed in British Pat. Nos. 956,474 and 1,086,404; in U.S. Pat. Nos. 3,281,378 and 3,567,763; polyisocyanate reaction products with acetals according to German Pat. No. 1,072,385; polyisocyanates prepared by telomerization reactions as described in Belgian Pat. No. 723,640; polyphenyl-polymethylene polyisocyanates as described in British Patent Specification Nos. 874,430 and 848,671; polyisocyanates which contain carbondiimide groups as described in German Pat. No. 1,092,007; perchlorinated arylpolyisocyanates such as those described, e.g., in German Pat. No. 1,157,601; polyisocyanates which contain allophanate groups as described, e.g., in British Pat. No. 994,890 and in Belgian Pat. No. 761,628; and the diisocyanates described in U.S. Pat. No. 3,492,330; polyisocyanates which contain biuret groups as described, e.g., in German Pat. No. 1,101,394; in British Pat. No. 889,050; and in French Pat. No. 7,017,514; polyisocyanates which contain isocyanurate groups as described, e.g., in German Pat. Nos. 1,022,789 and 1,027,394; and in British Pat. Nos. 1,091,949; 1,267,011 and 1,305,036; polyisocyanates which contain acylated urea groups according to U.S. Pat. No. 3,517,139; and polyisocyanates which contain urethane groups as described, e.g., in Belgian Pat. No. 752,261; or in U.S. Pat. No. 3,394,164. Mixtures of the above-named polyisocyanates may be used. Organic polyisocyanates which are modified with ionic groups, for example, with carboxyl and/or carboxylate groups and/or sulphonic acid groups and/or sulphonate groups may be used with the polyisocyanates in this invention. Polyisocyanates may be reacted with alkali metal silicates such as sodium metasilicate pentahydrate, potassium metasilicate pentahydrate, dry granular crude sodium silicate, and dry granular lithium silicate to produce polyisocyanate alkali metal silicate prepolymer with terminal isocyanate groups or terminal alkali metal silicate groups and may be used with the polyisocyanates in this invention. The polyisocyanate is mixed with the dry granular alkali metal silicate, then heated to 30° C. to 40° C. while agitating at ambient pressure for 10 to 30 minutes, thereby producing a polyisocyanate prepolymer. Any of the suitable non-ionic hydrophilically modified organic polyisocyanates may be used in this invention.

Suitable polyisocyanates such as the aromatic diisocyanates may be reacted with organic compounds which contain at least two hydrogen atoms capable of reacting with isocyanates, preferably with a molecular weight of, generally, from 300 to about 10,000 and in the ratio of from 50 to 99 mols of aromatic diisocyanates with 1 to 50 mols of said organic compounds to produce isocyanate-terminated reaction products. It is preferred to use polyols (organic polyhydroxyl compound), in particular, compounds and/or polymers which contain from 2 to 8 hydroxyl groups, especially those with a molecular weight of from about 800 to about 10,000 and preferably from 1,000 to about 6,000, e.g., polyesters, polyethers, polythioethers, polyacetals, polycarbonates or polyester amides containing at least 2, generally from 2 to 8, but preferably from 2 to 4 hydroxyl groups, of the kind known for producing homogenous and cellular polyurethanes. Compounds which contain amide groups, thiol groups or carboxyl groups may be used. Polyhydroxyl compounds (polyols) which already contain urethane or urea groups, modified or unmodified natural polyols, e.g., castor oil, carbohydrates and starches, may also be used. Additional products of alkylene oxides with phenolformaldehyde resins of urea-formaldehyde resins are also suitable for the purpose of the invention. Polybutadiene polymers with free hydroxyl groups, polysulfide polymers, polybutadienestyrene copolymers and butadiene-acrylonitrile copolymer chains are also suitable for the purposes of the invention.

Polyesters (polyols) containing hydroxyl groups may be, for example, reaction products of polyhydric alcohols, preferably dihydric alcohols and polybasic, preferably dibasic, carboxylic acids. The corresponding polycarboxylic acid anhydride or corresponding polycarboxylic acid esters of lower alcohols or their mixture may be used instead of the free polycarboxylic acids for preparing the polyesters. The polycarboxylic acid may be aliphatic, cycloaliphatic, aromatic and/or heterocyclic and may be substituted, e.g., with halogen atoms and may be unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. Any suitable polyhydric alcohols (polyol) may be used such as, for example, ethylene glycol, propylene-1,2- and -1,3-glycol, butylene-1,4- and -2,3-glycol, hexane-1,6-diol, octane-1,8-diol, neopentyl glycol, cyclohexanedimethol(1,4-bis-hydroxymethylcyclohexane), 2-methyl-propane-1,3-diol, glycerol, trimethylol propane, hexane-1,2,6-triol, butane-1,2,4-triol, trimethylol ethane, pentaerythritol, quinitol, mannitol, sorbitol, glucose, starches, fructose, cane sugar, dextrines, castor oils, methylglycoside, diethylene glycol, triethylene glycol, tetraethylene glycol, polyethylene glycols, dipropyleneglycol, polypropylene glycols, dibutylene glycol and polybutylene glycols. The polyesters may also contain a proportion of carboxyl end groups. Polyesters of lactones, such as ε-caprolactone or hydroxycarboxylic acids, such as ω-hydroxycaproic acid, may also be used.

The polyethers with at least 2, generally from 2 to 8 and, preferably, 2 to 3 hydroxyl groups, used according to the invention, are known and may be prepared, e.g., by the polymerization of epoxides, e.g., ethylene oxide, propyleneoxide, butylene oxide, tetrahydrofuran, styrene oxide or epichlorohydrin, each with itself, e.g., in the presence of $BF_3$ or by the addition of these epoxides, optionally as mixtures or successively, to starting components which contain reactive hydrogen atoms such as alcohols or amines, e.g., water, ethylene glycol, propylene-1,3- or -1,2-glycol, trimethylol propane, 4,4'-dihydroxydiphenylpropane, aniline, ammonia, ethanolamine or ethylenediamine. Sucrose polyethers such as those described, e.g., in German Pat. Nos. 1,176,358 and 1,064,938 may also be used according to this invention. It is frequently preferred to use polyethers which contain predominantly primary OH groups (up to 90% by weight, based on the total OH group content of the polyether). Also suitable are polyethers modified with vinyl polymers such as those which may be obtained by polymerizing styrene or acrylonitrile in the presence of polyethers (U.S. Pat. Nos. 3,383,351; 3,304,273; 3,525,093 and 3,110,695; and German Pat. No.

1,152,536) and polybutadienes which contain OH groups.

"Polythioethers" mean, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the cocomponent.

The polyacetals used may be, for example, the compounds which may be obtained from glycols, e.g., diethylene glycol, triethylene glycol (4,4'-dihydroxydiphenyldimethylmethane), hexanediol and formaldehyde. Polyacetals suitable for the invention may also be prepared by the polymerization of cyclic acetals.

The polycarbonates with hydroxyl groups used may be of the known kind, e.g., those which may be prepared by reacting diols, e.g., propane-1,3-diol, butane-1,4-diol and/or hexane-1,6-diol or diethylene glycol, triethylene glycol or tetraethylene glycol, with diarylcarbonates, e.g., diphenylcarbonate or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Examples of these compounds which are to be used, according to the invention, have been described, e.g., in High Polymers, Volume XVI, "Polyurethanes, Chemistry and Technology", published by Saunders-Frisch, Interscience Publishers, New York, London, Volume I, 1962, pages 32 to 42 and pages 44 to 54 and Volume II, 1964, pages 5 and 6 and pages 198 and 199; and in Kunststoff-Handbuch, Volume VII, Vieweg-Hochtlen, Carl-Hanser-Verlag, Munich, 1966, e.g., on pages 45 to 71.

Suitable modified organic polyisocyanates, as well as their prepolymers, especially those based on aromatic polyisocyanates, can also be subsequently modified to give ionic groups, for example, by reaction with sulfones, beta-lactones, and by grafting on acrylic acid, methacrylic acid or crotonic acid, for example, or by sulphuric acid, chlorosulphonic acid, oleum or sulphur trioxide and then used in the invention. In particular, organic polyisocyanates such as tolylene diisocyanate, diphenylmethane diisocyanate, hexamethylene diisocyanate and the known phosgenation products of the condensation products of aromatic monoamines, especially aniline and aldehyde, especially formaldehyde which is reacted with sulphuric acid, oleum or sulphur trioxide, may be used in this invention. Sulphonated polyisocyanates of this kind which generally still contain ureadione, urea and buret groups and, in particular, where polyol modification has been carried out before sulphonation, urethane and/or allophanate groups which are formed through secondary reactions during sulphonation are, therefore, particularly preferred as polyisocyanates containing ionic groups. The NCO-terminated prepolymers used, for example, for the production of aqueous polyurethane dispersions (U.S. Pat. No. 3,756,992) can be used for the process according to the invention.

Component C

Component C contains organic amphiphilous compounds, preferably containing from 1 to 9 carbon atoms, and has a molecular weight of from 12 to about 400, preferably from 32 to 150, which contain one OH group and/or at least one other hydrophilic and/or polar group. The other hydrophilic and/or polar group is, preferably, a functional group corresponding to one of the following general formulae: RSH, $RCH_2Cl$, $RCH_2Br$, $RCH_2I$, RCN, $RNO_2$, RCOCl, RCOBr, $RSO_2Cl$, RCOOH, $RSO_3H$, $RCOO^-$, $RSO_3^{-1}$, ROR,

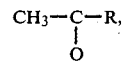

wherein R denotes a methyl, ethyl or propyl group. The organic amphiphilous compounds of Component C may contain an OH group and/or from to to 6, preferably 1 or 2, of these other functional groups.

The following are examples of Component C:

1. Alcohols, thioalcohols, phenols and thiophenols: Methanol, ethanol, propanol, isopropanol, butanol, isobutanol, t-butyl alcohol and the isomeric pentanols, hexanols and heptanols, cyclohexanol, methylcyclohexano-methanol, benzyl alcohol, butylmercaptan, phenols, e.g., phenol and the cresols, thiophenols and thiocresols; also alcohols with from 1 to 4 carbon atoms are preferred, particularly methanol.

2. Aldehydes: Formaldehyde, acetaldehyde, propionaldehyde, butyl aldehyde, pentanals, hexanals, heptanals, octanals, and their simple substitution products, semi-acetals and full acetals.

3. Carboxylic acids: Formic acid, acetic acid, propionic acid, butyric acid, isobutyric acid, pentanoic acid, hexane carboxylic acid, heptane carboxylic acid, cyclohexane carboxylic acid, benzoic acid, toluic acid.

4. Carboxylic acid chlorides, carboxylic acid bromides, sulphonic chlorides: Acetyl chloride, propionic acid chloride, acetyl bromide, acid chlorides of $C_4$–$C_6$ monocarboxylic acids, but also methanesulphonic acid chloride, benzenesulphonic acid chloride, p-toluenesulphochloride, o-toluenesulphochloride, carbamic acid chlorides, e.g., t-butyl carbamic chloride, and phenulcarbamic chloride.

5. Esters: Methyl acetate, ethyl acetate, propylacetate, butyl acetate, amyl acetate, the methyl and ethyl esters of propionic, butyric, pentanoic, hexanoic and heptanoic acid and the corresponding isomeric compounds, for example, isobutyric acid and 2,4,6-tribromophenylacetate.

6. Ethers and thioethers: Methyl ethyl ether, cyclohexyl methyl ether, methyl butyl ether, phenol methyl ethyl, thiophenol methyl ether, cresol methyl ether, tetrahydrofuranomethyl-methyl ether.

7. Halomethyl compounds: Ethyl chloride, ethyl bromide, ethyl iodide, n-propylchloride, n-propylbromide, n-propyliodide, isopropyl chloride, isopropyl bromide, isopropyl iodide, butyl chloride, butyl bromide, butyl iodide, $C_3$–$C_6$-halogenated methyl compounds, benzylhalides, e.g., benzylchloride or benxylbromide, hexahydrobenzyl halides, e.g., cyclohexanomethyl chloride, epichlorohydrin, 2-ethyl-2-chloromethyloxetane and 2-ethyl-2-chloro-methyloxetane. Halogenated methyl compounds which contain from 4 to 7 carbon atoms are preferred.

8. Ketones: Methyl ethyl ketone, methyl-isopropyl ketone, methylisobutyl ketone, methyl-isoamil ketone, methyl-n-propyl ketone, methyl-n-butyl ketone, methyl-t-butyl ketone, methyl-furanyl ketone, methyl-tetrahydrofuranyl ketone, methyl-heptyl ketone, ethylhexyl ketone, acetophenone, ω-chloroacetophenone and propiophenone.

9. Nitriles: Acetonitrile, propionitrile, butyronitrile, tolunitrile, hexahydrobenzonitrile, acrylonitrile, allylnitrile, methallylnitrile, methacrylonitrile.

10. Nitro compounds: Nitromethane, nitroethane, nitrohexane, nitrobenzene, chlorinated nitrobenzenes, nitro-cycohexanes, brominated nitrobenzenes, benzyl nitrate and nitrotoluene.

11. Sulphonic acids: Methanesulphonic acid, ethanesulphonic acid, butanesulphonic acid, benzenesulphonic acid, 2-toluenesulphonic acid, 4-toluenesulphonic acid, chlorosulphonic esters and sulphonic acid esters, e.g., methanesulphonic acid methyl ester, methane sulphonic acid ethyl ester and chlorosulphonic acid methyl ester.

The carboxyl acids and/or sulphonic acids may be partially or completely neutralized, for example, with an alkali metal and alkaline earth metal hydroxides, e.g., sodium hydroxide, barium hydroxide or magnesium hydroxide; or by the addition of amines, e.g., trimethylamine, triethylamine, methylmorpholine, pyridine, dimethylaniline or metal alcoholates, e.g., sodium t-butanolate or potassium isopropanolate. Metal oxides, hydroxides or carbonates, either in the solid form or suspended in diluents, may also be used for neutralization. Calcium oxide, magnesium oxide, calcium carbonate, magnesium carbonate and dolomite, for example, are particularly suitable. Tertiary amines are useful in this neutralization, e.g., alkoxylated products of primary and secondary amines, and also polyesters or polyacrylates which contain tertiary nitrogen atoms as well as the known condensation products based on epichlorohydrin and polyamines.

12. Components C, according to this invention, may also comprise compounds which contain phosphorus, for example, trimethyl phosphite, trimethylphosphates, triethylphosphite, triethylphosphate, diethylphosphite, diethylphosphate, dimethylphosphite, dimethylphosphate, thiophosphoric acid-O, O-dimethylester, thiophosphoric acid trimethylester, or thiophosphoric acid-O, O-dimethylester chloride.

13. Lignin: Calcium lignosulfonate, lignosulfonic acid sodium salts, lignosulfonic acid, lignin sulfate produced by the alkali process (Kraft's process) and, particularly, desulfonated lignin.

Component D

Component D contains the curing agents and/or activators. The following are examples of Component D:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates may also be used. The molar ratio of $Ml_2ISiO_2$ (Ml=metal) is not critical and may vary within the usual limits, but is, preferably, between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate pentahydrate such as sodium, commercial dry granular sodium, potassium silicate and potassium metasilicate pentahydrate.
6. Water containing 20% to 70% by weight of silica sol.
7. Water containing 0.001% to 10% by weight of an activator (catalyst) such as:
    (a) tertiary amines, e.g., triethylamine, tributylamine, N-methyl-morpholine, N-ethyl-morpholine, N-cocomorpholine, N,N,N',N'-tetramethylethylenediamine, 1,4-diazo-bicyclo-(2,2,2)-octane, N-methyl-N'-dimethylaminoethyl, piperazine, N,N-dimethylbenzylamine, bis (N,N-diethylaminoethyl)-adipate, N,N-diethylbenzylamine, pentamethyldiethylenetriamine, N,N-dimethylcyclohexylamine, N,N-dimethylcyclohexylamine, N,N,N',N'-tetramethyl-1,3-butanediamine, N,N-dimethylbetaphenylethylamine and 1,2-dimethylimidazole. Suitable tertiary amine activators which contain hydrogen atoms which are reactive with isocyanate groups include, e.g., triethanolamine, triisopanolamine, N,N,N',N'-dimethylethanolamine, N-methyldiethanolamine, N-ethyl-diethanolamine and their reaction products with alkylene oxides, e.g., propylene oxide and/or ethylene oxide.
    (b) Organo-metallic compounds, preferably organotin compounds such as tin salts of carboxylic acids, e.g., tin acetate, tin octoate, tin ethyl hexoate, tin laurate and the dialkyl tin salts of carboxylic acids, e.g., dibutyl tin diacetate, dibutyl tin dilaurate, dibutyl tin meleate or diocyl tin diacetate.
    (c) Silaamines with carbon-silicon bonds as described, e.g., in British Pat., No. 1,090,589, may also be used as activators, e.g., 2,2,4-trimethyl-2-silamorpholine or 1,3-diethylaminomethyl-tetramethyldisiloxane.
    (d) Other examples of catalysts which may be used according to the invention and details of their action are described in Kunststoff-Handbuch, Volume VIII, published by Vieweg and Hochtlen, Carl-Hanser-Verlag, Munich, 1966, on pages 96 and 102.

8. 0.001% to 10% by weight, based on the reaction mixture, of an activator (catalyst) listed above.
9. Water containing 20% to 70% by weight of a water-binding agent which is capable of absorbing water to form a solid or a gel, such as hydraulic cement, synthetic anhydrite, gypsum or burnt lime.
10. Water containing 1% to 10% by weight of bases which contain nitrogen such as tetraalkyl ammonium hydroxides.
11. Water containing 1% to 10% by weight of alkali metal hydroxides such as sodium hydroxide, alkali metal phenolates such as sodium phenolate or alkali metal alcoholates such as sodium methylate.
12. Water containing sodium polysulfide in the amount of 1% to 10% by weight.

Surface-active additives (emulsifiers and foam stabilizers) may also be used, according to the invention. Suitable emulsifiers are, e.g., the sodium salts of ricinoleic sulphonates or of fatty acids or salts of fatty acids with amines, e.g., oleic acid diethylamine or stearic acid diethanolamine. Other surface-active additives are alkali metal or ammonium salts of sulphonic acids, e.g., dodecylbenzene sulphonic acid or dinaphthyl methane disulphonic acid; or of fatty acids, e.g., ricinoleic acid; or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of from 0% to 20% by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g, tris-chlorethylphosphate or ammonium phosphate and polyphosphates, stabilizers against aging and weathering, plasticizers, fungicidal and bacteriocidal substances and fillers, e.g., barium sulphate, kieselguhr, carbon black or whiting, may also be used, according to the invention.

Further examples of surface-active additives, foam stabilizers, cell regulators, negative catalysts, stabilizers, flame-retarding substances, plasticizers, dyes, fillers, fungicidal and bacteriocidal substances, details about methods of using these additives, and about their action, may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retardant agents.

Particularly important and preferred are those additives which result in an even greater improvement in the fire characteristics of the product. These include not only the conventional flameretarding agents, but also, in particular, halogenated paraffins and inorganic salts of phosphoric acid.

According to the invention, it has been further found that it is favorable to carry out the reaction in the additional presence of a compound acting as hardening agent and lowering the pH of the reaction mixture. Suitable compounds of this type include, depending on the reaction mixture employed, ammonium chloride, barium chloride, barium nitrate, bleaching earths, disodium phosphate, calcium-magnesium carbonate, calcium bromide, calcium chloride, calcium iodate, potash alum, potassium fluoride, potassium borofluoride, potassium bromide, potassium carbonate, potassium metabisulfite, potassium silicofluoride, magnesium carbonate, magnesium fluoride, magnesium oxide, magnesium phosphate, monoammonium phosphate, monosodium phosphate, sodium antimonate, sodium acetate, sodium bichromate, sodium bifluoride, sodium bisulfate, sodium bromide, sodium fluoride, sodium hexametaphosphate, tetrapotassium pyrophosphate, zinc acetate, zinc carbonate and boric acid. The hardening agent may be added to Components C or D in an amount sufficient to lower the pH to 7 to 8.

SUMMARY OF THE INVENTION

I have discovered that a broken-down alkali metal lignin-cellulose product, an organic polyisocyanate and an amphiphilous organic compound will react chemically to produce a polyisocyanate lignincellulose plastic product.

The preferred method is to react a polyisocyanate and/or isocyanate-terminated polyurethane prepolymer of Component B with a broken-down alkali metal lignin-cellulose polymer or Component A to produce a polyisocyanate alkali metal cellulose prepolymer and/or polyurethane, alkali metal cellulose prepolymer which is then reacted with an organic compound (or mixture thereof) of Component C and, optionally, a curing agent and/or an activator of Component D to produce a polyisocyanate cellulose solid or cellular solid product.

The proportion, by weight, of Component D when used with Component B is preferably from 1:70 to 80:20, and the quantity of Component C is from 1% to 30% by weight, preferably from 2% to 20% by weight, based on Component B. The proportion is 2 parts by weight of Component A to 1 to 10 Parts by weight of Component B.

In an alternate method, the Components A, B, C and, optionally, D are added simultaneously and mixed homogeneously, and in a short period of time (a few seconds to about 10 minutes), the chemical reaction begins and a solid or cellular solid product is produced.

In another alternate method, the Components A, B, C and a polyol are added simultaneously and mixed homogeneously, and within a few seconds to 10 minutes, the mixture reacts chemically to produce a solid or cellular solid product.

The polyisocyanate may be first reacted with an oxidated silicon compound to produce a polyisocyanate prepolymer which is then reacted with Components A, C and, optionally, D to produce a solid or cellular solid product.

Mixtures which contain more than 30% by weight of water are usually soft, solid products which may be used as putties, surface coatings, adhesive bonds, grouting compositions, caulking compositions and may be used for producing foams by adding a blowing agent. The blowing agents are usually inert liquids with boiling points ranging from $-25°$ C. to $80°$ C.

The blowing agents used may be, e.g., acetone, ethyl acetate, methanol, ethanol, halogenated alkanes, e.g., methylene chloride, chloroform, ethylidene chloride, vinylidene chloride, monofluorotrichloromethane, chlorodifluoromethane, dichlorodifluoromethane, butane, kexane, heptane or diethyl ether. Compounds which decompose at temperatures above room temperature with liberation of gases, e.g., nitrogen, such as azo compounds, azoisobutyric acid nitrile, may also act as blowing agents. Other examples of blowing agents and details about the use of blowing agents are described in Kunststoff-Handbuch, Volume VII, published by Vieweg and Hochtlen, Carl-Hanser-Verlag, Munich, 1966, on pages 108 and 109, 453 to 455 and 507 to 510.

The proportions of the components may be adjusted to obtain the desired product, ranging from a solid to a highly cellular solid. When water is used, it reacts with the NCO group to produce $CO_2$ and pores are produced in the product by the evolved $CO_2$. In certain cases, the $CO_2$ is rapidly evolved and escapes before the product hardens so that a solid product can be produced nearly completely free of air cells. The hardening times generally increase with decreasing proportions of Component C.

Powdered calcium, magnesium, aluminum or zinc may be used and will react with the alkali metal ions to bring about the evolution of hydrogen which acts as a blowing agent. Compressed gases such as air, nitrogen, methane, etc., may be mixed in the components and may also be used to mix the components, then be used as the blowing agent. These metal powders also have a hardening and reinforcing effect.

The properties of the foams (cellular solids) obtained from any given formulation, e.g., their density in the moist state, depends, to some extent, on the details of the mixing process, e.g., the form and speed of the stirrer and the form of the mixing chamber, and also the selected temperature at which foaming is started. The foams will usually expand from 3 to 12 times their original volume.

The products produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling and moistureproofing coating. The foaming material may also be forced, poured or injection-molded into cold or heated molds which may be relief molds or solid or hollow molds, optionally by centrifugal casting, and left to harden at room temperature or at temperature up to 200° C., optionally under pressure. In certain cases, it may be necesssary to heat the mixing or spraying apparatus in order to initiate foaming; then once foaming has started, the heat evolved by the reaction between components continues the foaming until the reaction is complete. A temperature between 40° C. and 150° C. may be required to initiate foaming.

Reinforcement elements may be incorporated into the reaction mixtures. The inorganic and/or organic reinforcing elements may be, e.g., fibers, metal wires, foams, fabrics, fleeces or skeletons. The reinforcing element may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies. e.g., as containers for goods which may be required to be kept moist or cool, as filter materials or exchanges, as catalyst carriers or carriers of other active substances, as decorative elements, furniture components and fillings for cavities. They may be used in the field of model building and mold building; also the production of molds for metal casting may be considered.

According to the preferred method of carrying out the process, the blowing agent may be added to Component A, B or C and the emulsifier added to Component A, C or D. Instead of blowing agents, finely divided inorganic or organic hollow particles, e.g., hollow expanded beads of glass, plastic and straw may be used for producing cellular solid products. These products may be used as thermal- or sound-insulating materials, cavity fillings, packaging materials, building materials which have good solvent resistance and advantageous fire characteristics. They may also be used as light-weight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or of other polymers, e.g., polysulphone, polyepoxide, polyurethane, polyurethane silicate, urea-formaldehyde, formaldehyde-urea silicate, phenol-formaldehyde, formaldehyde-phenol silicate, or polyimide polymers, or, alternatively, heaps of these particles may be permeated with foaming reaction mixtures to produce insulating materials which have good fire-resistant characteristics.

The cellular solid products of the invention, in the aqueous or dry or impregnated state, may subsequently be lacqured, metallized, coated, laminated, galvanized, vapor treated, bonded or blocked. The cellular solid products may be sawed, drilled, planed, polished or changed by other working processes to produce shaped products. The shaped products, with or without fillers, may be further modified in their properties by subsequent heat treatment, oxidation processes, hot pressing, sintering processes or surface melting or other compacting processes.

The novel cellular solid products of the invention are also suitable for use as constructional materials, due to their toughness and stiffness, yet they are still elastic. They are resistant to tension and compression, have a high dimensional stability to heat and high flame resistance. They have excellent sound-absorption capacity, heat-insulating capacity, fire resistance and heat resistance, which makes them useful for insulation. The cellular products of this invention may be foamed on the building site and, in many cases, may be used in place of wood or hard fiber boards. The brittle foams may be crushed and used as a filler, as a soil conditioner and as a substrate for the propagation of seedlings, cuttings and plants or cut flowers.

Suitable water-binding agents may be used in this invention, such as hydraulic cement, gypsum, synthetic anhydrites and burnt lime. Hydraulic cements such as Portland cement, quick-setting cement, mortar cement, glast-furnace Portland cement, sulphate-resistant cement, brick cement, mild-burnt cement, natural cement, lime cement, gypsum cement, calcium sulfate cement, pozzolan cement, etc., contain oxidated silicon compounds and may be used in this invention.

There are many different kinds of cement which may be used; in general, any mixture of the following may be used: fine ground lime, alumina and silica that will set to a hard product by admixture of water which combines chemically with the other ingredients to form a hydrate. Detailed descriptions of the many kinds of cement which react with sand and rocks to produce concrete may be found in "Encyclopedia of Chemical Technology", Volume 4, Second Edition, Published by Kirk-Othmer, pages 684 to 710, as well as in other well-known references in this field.

A water-binding component such as hydraulic cement, synthetic anhydrides, gypsum or burnt lime may be added to any of the components, or may be mixed simultaneously with Components A, B, C and D, to produce a tough, somewhat flexible solid or cellular solid concrete. This mixture may be used as surface coating having good adhesion and resistance-to-abrasion properties, as mortars, for making molded products, particularly in construction engineering and civil engineering as for building walls, igloos, boats, etc., and for road building. These products are light weight, thermal-insulating materials with excellent mechanical properties and fire resistance. It is preferable that the polyisocyanate of Component B is an isocyanate-terminated polyurethane prepolymer or that a polyol is added in Component A, C or D in the ratio of 1 to 50 mols of the polyol to 50 to 99 mols of the polyisocyanate. Good polyisocyanate cellulose plastic concrete products can be obtained without using polyurethane prepolymers or polyols. The amount of water-binding component used varies greatly, depending on the type of product desired, from 0% to 100% by weight, based on the weight of Components A, B and C. In certain cases, it is desirable to add sand and gravel in the amount of 1 to 6 parts by weight to each part by weight of the hydraulic cement used in the invention. The mixture may be poured in place, troweled on or sprayed onto the desired surface, to produce a solid or cellular solid product.

Fillers in the form of powders, granules, wire, fibers, dumbbell-shaped particles, crystallites, spirals, rods, beads, hollow beads, foam particles, non-woven webs, pieces of woven or knitted fabrics, tapes and pieces of foil made of solid inorganic or organic substances, e.g., dolomite, chalk, alumina, asbestos, basic silicic acids, sand, talc, iron oxide, aluminum oxide and hydroxides, alkali metal silicates, zeolites, mixed silicates, calcium silicates, calcium sulphates, aluminosilicates, cements, basalt wool or powder, glass fibers, carbon fibers, graphite, carbon black, Al-, Fe-, Cu- and Ag-powders, molybdenum sulphide, steel wool, bronze or copper meshes, silicon powder, expanded clay particles, hollow glass beads, glass powder, lava and pumice particles, wood chips, woodmeal, cork, straw, popcorn, coke or particles of filled or unfilled, foamed or unfoamed, stretched or unstretched organic polymers, may be added to the mixture of the Components A, B, C and D in many applications. Among the numerous organic polymers which may be used as fillers, the following may be mentioned as examples: polystyrene, polyethylene, polypropylene, polyacrylonitrile, polybutadiene, polyisoprene, polytetrafluorethylene, aliphatic and aromatic polyesters, melamine, urea, phenol resins, polyacetal resins, polyepoxides, polyhydantoins, polyureas, polyethers, polyurethanes, polyimides, polyimides, polyamides, polysulphones, polycarbonates and copolymers thereof.

The composite materials, according to the invention, may be mixed with considerable quantities of fillers without losing their advantageous properties. In particular, composite materials which consist predominantly of inorganic constituents are preferably filled with inorganic fillers; where silicate constituents predominate, they are preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free of isocyanate groups. The mixtures obtained in this way have a long pot life and may be applied in thin layers which gradually harden in the course of time. The liberated $CO_2$ acts as the curing agent. In a two-stage or multistage hardening which results when an excess of water is used, there is a rapid evolution of $CO_2$ and the polyisocyanate cellulose solid product is converted into a plastic or thermoplastic, workable form which may be used as putties, coating agents, grouting materials or mortar. This thermoplastic form may also be injection-molded, extruded or work-up in a kneader.

In many cases, the polyisocyanate lignin-cellulose solid or cellular solid products produced by the invention are soluble in organic solvents and may be used as a tough coating agent for wood and metal. The mixtures of the invention are also suitable for use as impregnating agents for finishing fibers. The mixtures may also be extruded through dies or slots and converted into fibers and foils. These fibers and foils may be used for producing synthetic incombustible paper or fleeces.

The object of the present invention is to provide a novel method of producing polyisocyanate lignin-cellulose solid or cellular solid products. Another object is to produce novel polyisocyanate lignin-cellulose solid or cellular solid products which are relatively low in cost. Still another object is to produce novel fine cellular solid products of relatively low cost, rigid, light weight, highstrength, having good flame resistance and dimensional stability when heated. Another object is to produce solid-cellular solid products that may be used for thermal insulating, structural purposes, sound proofing, shock-resistant packaging, cushions, coating for wood and metals, adhesives, casting material, putty, etc. Another object is to produce polyisocyanate lignin-cellulose foam utilizing alkali metal silicate to produce foams with excellent flame-resistant properties.

DESCRIPTION OF PREFERRED EMBODIMENTS

My invention will be illustrated in greater detail by the specific examples which follow, it being understood that these preferred embodiments are illustrative, but not limited to, procedures which may be used in the production of polyisocyanate lignin-cellulose solid or cellular solid products. Parts and percentages are be weight unless otherwise indicated.

EXAMPLE 1

About 2 parts by weight of fir sawdust and 1.5 parts by weight of sodium hydroxide flakes are mixed, then heated to between 150° C. to 220° C. while agitating at ambient pressure for 5 to 60 minutes or until the mixture softens and expands into a brown, thick liquid which solidifies on cooling, thereby producing a broken-down sodium lignin-cellulose polymer.

EXAMPLE 2

About 2 parts by weight of small plant particles listed below and 2 parts by weight of sodium hydroxide are mixed, then heated to between 150° C. and 220° C. while agitating at ambient pressure, with care being taken to avoid burning the mixture, for 5 to 60 minutes; the mixture begins to expand and a brown, thick liquid, broken-down sodium lignin-cellulose polymer is produced. The liquid solidifies on cooling and is ground into a powder. The powder is soluble in water, alcohols, polyhydric organic compounds and other solvents.

(a) Oak sawdust;
 (b) Fir sawdust;
 (c) Ash sawdust;
 (d) Seaweed;
 (e) Equal parts cotton and fir sawdust;
 (f) Corn cobs;
 (g) Cotton stalks;
 (h) Bagasse;
 (i) Equal parts paper and fir sawdust;
 (j) Oat straw;
 (k) Grass clippings.

EXAMPLE 3

About 2 parts by weight of an alkali metal cellulose product as produced in Example 1 and in the form of a powder are mixed with 2 parts by weight of tolylene diisocyanate (TDI), then agitated for 10 to 60 minutes at a temperature between 20° C. and 70° C., thereby producing a polyisocyanate alkali metal lignin-cellulose prepolymer. About 1 part by weight of methanol containing 10% by weight of triethylene amine is thoroughly mixed with the prepolymer. The mixture expands 3 to 8 times its original volume, thereby producing a rigid cellular solid polyisocyanate cellulose plastic product.

Other broken-down alkali metal lignin-cellulose polymers may be used in place of that produced in Example 1, such as 2a, 2b, 2c, 2d, 2e, 2f, 2g, 2h, 2i, 2j and 2k.

EXAMPLE 4

Example 3 is modified wherein 1 part by weight of a polyol is added to the methanol, then mixed with the polyisocyanate alkali metal lignin-cellulose prepolymer. The polyol is selected from the following list:

| Example | Polyol | Type of Product |
|---|---|---|
| a | Polyethylene glycol (mol. wt. 380); | Semi-rigid foam; |
| b | Polyethylene glycol (mol. wt. 1000); | Semi-rigid foam; |
| c | Polypropylene glycol (mol. wt. 600); | Semi-rigid foam; |
| d | POLY-G 20-112 produced by Olin Chemicals (Polyethylene diol); | Semi-rigid foam; |
| e | POLY-G 71-357 produced by Olin Chemicals (Surcose amine polyol); | Rigid foam; |
| f | POLY-G 30-56 produced by Olin Chemicals (Polyethylene triol); | Semi-rigid foam; |
| g | Castor oil. | Semi-rigid foam. |

EXAMPLE 5

About 2 parts by weight of the broken-down alkali metal lignin-cellulose polymer in the form of a powder as produced in Example 2b, 2 parts by weight of MDI ("PAPI" produced by Upjohn), and 1 part by weight of the various organic chemicals listed below are simultaneously mixed, thereby producing a rigid polyisocyanate cellulose cellular product.
(a) Ethanol;
(b) Propanol;
(c) Isopropanol;
(d) Allyl alcohol;
(e) Acetic acid;
(f) Propionic acid;
(g) Benzoic acid;
(h) Phenol;
(i) Cresol;
(j) Acetaldehyde;
(k) Furfuraldehyde;
(l) Acetonitrile;
(m) 4-toluene sulphonic acid;
(n) Propionic acid chloride.

EXAMPLE 6

About 2 parts by weight of the broken-down alkali metal lignin-cellulose polymer as produced in Example 2a in the form of a powder and 3 parts by weight of MDI are mixed, then agitated for 10 to 60 minutes at a temperature between 20° C. and 70° C., thereby producing a polyisocyanate alkali metal lignin-cellulose prepolymer. About 1 part by weight of epichlorohydrin, containing 10% by weight of triethylamine, is thoroughly mixed with the prepolymer and in a few seconds, the mixture begins to expand and produces a cellular solid polyisocyanate lignin-cellulose plastic.

Other organic compounds may be used in place of epichlorohydrin, such as 2-ethyl-2-chloromethyl-oxetane, acetone, ethanol, isopropanol, allyl alcohol, triophenol, furfural, ethyl acetate, cyclohexyl methyl ether, ethyl chloride, benzyl chloride, propionitrile, acrylonitrile, nitroethane and mixtures thereof.

EXAMPLE 7

Example 6 is modified by adding 0.5 part by weight of a blowing agent, trichlorofluoromethane, to the polyisocyanate alkali metal lignin-cellulose prepolymer.

Other blowing agents may be used in place of trichlorofluoromethane, such as butane, dichlorodifluoromethane, isobutylene, vinyl chloride and compressed air or nitrogen.

EXAMPLE 8

The broken-down alkali metal lignin-cellulose polymer as produced in Examples 2d and 2e are equally mixed, then 2 parts by weight of the mixture are added to 2 parts by weight of epichlorohydrin containing 10% triethylene diamine and thoroughly mixed, then 2 parts by weight of a 20% solution of a distillation residue of the distillation of commercial tolylene diisocyanate in a crude phosgenation product of an aniline-formaldehyde condensation with an NCO content of about 30% are thoroughly and rapidly mixed. The mixture begins to expand in a few seconds, thereby producing a rigid cellular solid polyisocyanate lignin-cellulose plastic.

EXAMPLE 9

About 2 parts by weight of the broken-down alkali metal lignin-cellulose polymer as produced by Example 2b and 4 parts by weight of an isocyanate-terminated polyurethane prepolymer, listed below, and thoroughly mixed, then agitated for 10 to 60 minutes at a temperature between 20° C. and 70° C., thereby producing a polyurethane alkali metal lignin-cellulose prepolymer. One part by weight of acetic acid is added to the prepolymer and rapidly mixed. The mixture begins to expand in a few seconds to produce a cellular solid polyurethane lignin-cellulose plastic.

| Example | Isocyanate-terminated Polyurethane Prepolymer |
|---|---|
| a | MDI reacted with 5% acetic acid; |
| b | MDI reacted with 1% propylene glycol; |
| c | MDI reacted with 2% polyethylene glycol mol. wt. 380); |
| d | Toluene diisocyanate with polypropylene glycol (mol. wt. 500) in an NCO/OH ratio of 25:1; |
| e | Diisocyanatodiphenylmethane with a tetra-functional polypropylene glycol (mol. wt. 500) to produce a prepolymer having about 22% NCO groups; |
| f | Toluene diisocyanate with castor oil to produce a prepolymer with an NCO content of about 15%; |
| g | Toluene diisocyanate with a hydroxyl-group-containing polysulfide polymer to produce a prepolymer with an NCO content of about 12%; |
| h | Methylene bis-phenyl diisocyanate with a liquid poly-epichlorohydrin to produce a prepolymer of about 16% and 25% by weight of a resin extender, polyalpha-methyl-styrene are added, percentage based on weight of prepolymer; |
| i | Tolylene diisocyanate with a polyester (4 mols of glycerol, 2.5 mols of adipic acid and 0.5 mol of phthalic anhydride) to produce a propolymer with an NCO content of about 23%; |
| j | Toluene diisocyanate with polyethylene (mol. wt. 2000) to produce a prepolymer with an NCO content |

-continued

| Example | Isocyanate-terminated Polyurethane Prepolymer |
|---------|------------------------------------------------|
|         | of about 28%.                                  |

EXAMPLE 10

| Component A:     | 1 part by weight of the broken-down alkali metal lignin-cellulose polymer as produced in Example 1; |
|------------------|-----------------------------------------------------------------------------------------------------|
| Component B:     | 2 parts by weight of MDI;                                                                           |
| Component C:     | 1 part by weight of ethylene chloride;                                                              |
| Activator:       | 0.1 part by weight of triethanolamine;                                                              |
| Emulsifier:      | 0.1 part by weight of sodium salt of a fatty acid;                                                  |
| Filler:          | 0.2 part by weight of 0.5 cm. glass fibers;                                                         |
| Hardener:        | 0.2 part by weight of ammonium chloride;                                                            |
| Foam stabilizer: | 0.2 part by weight of a polymethylsiloxane silicate reacted with propylene oxide as produced by the process in U.S. Pat. No. 4,120,937; |
| Polyol:          | 0.5 part by weight of polyethylene glycol (mol. wt. 600).                                           |

Components A, B, C, activator, emulsifier, hardener, filler and foam stabilizer are simultaneously and rapidly admixed and the mixture begins to expand in a few seconds to produce a cellular solid polyisocyanate lignin-cellulose plastic.

EXAMPLE 11

| Component A:        | 3 parts by weight of the broken-down alkali metal lignin-cellulose polymer as produced in Example 1; |
|---------------------|------------------------------------------------------------------------------------------------------|
| Component B:        | 3 parts by weight of MDI (PAPI 27 by Upjohn);                                                        |
| Component C:        | 1 part by weight of epichlorohydrin;                                                                 |
| Activator:          | 0.1 part by weight of triethylenediamine;                                                            |
| Component D:        | 0.5 part by weight of water containing 25% sodium silicate;                                          |
| Emulsifier:         | 0.1 part by weight of the sodium salt of lignosulfonic acid;                                         |
| Water-binding agent:| 3 parts by weight of Portland cement;                                                                |
| Blowing agent:      | 0.4 part by weight of methylene chloride.                                                            |

Components A, C and D, activator, emulsifier, water-binding agent and blowing agent are thoroughly mixed, then Component B is thoroughly admixed and in a few seconds, the mixture begins to expand and hardens into a cellular solid polyurethane lignin-cellulose plastic.

Other water-binding agents may be used in place of Portland cement, such as gypsum, burnt lime and synthetic anhydrite.

EXAMPLE 12

| Component A:        | 2 parts by weight of the broken-down alkali metal lignin-cellulose polymer as produced in example 2i; |
|---------------------|-------------------------------------------------------------------------------------------------------|
| Component B:        | 2 part by weight of "Crude MDI", (polyphenylpolymethylene-isocyanates obtained by aniline-formaldehyde condensation followed by phosgenation); |
| Component C:        | 0.2 part by weight of chlorohydrin;                                                                   |
| Activator:          | 0.1 part by weight of triethylamine;                                                                  |
| Water-binding agent:| 5 parts by weight of Portland cement;                                                                 |
| Polyol:             | 1 part by weight of sucrose amine polyol (POLY G 71-357 produced by Olin Chemicals).                  |

Components A, B and C, activator, water-binding agent and polyol are admixed substantially simultaneously and in a short period of time, the mixture begins to expand to produce a tough, rigid cellular solid polyurethane lignin-cellulose plastic. Component D, water, is then added in sufficient amount to wet the foam, thereby curing the unreacted Portland cement.

EXAMPLE 13

| Component A: | 1 part by weight of broken-down alkali metal lignin-cellulose polymer as produced in Example 2f; |
|--------------|--------------------------------------------------------------------------------------------------|
| Component B: | 3 parts by weight of MDI;                                                                        |
| Component C: | 0.5 part by weight of chloroform;                                                                |
| component D: | 1 part by weight of water;                                                                       |
| Activator:   | 0.1 part by weight of triethylenediamine;                                                        |
| Hardener:    | 0.2 part by weight of monoammonium phosphate.                                                    |

Components A, C and D, the activator and hardener are mixed and Component A goes into solution; then Component B is added and rapidly and thoroughly mixed. The mixture expands in a few seconds, to produce a rigid cellular solid polyisocyanate lignin-cellulose plastic.

EXAMPLE 14

| Component A:   | 4 parts by weight of broken-down alkali metal lignin-cellulose polymer as produced in Example 2b; |
|----------------|---------------------------------------------------------------------------------------------------|
| Component B:   | 3 parts by weight of MDI ("PAPI 27" as produced by Upjohn);                                       |
| Component C:   | 0.5 part by weight of an alcohol compound listed below;                                           |
| Component D:   | 1 part by weight of aqueous sodium silicate containing 60% sodium silicate ($Na_2O:SiO_3$ ratio of 1:1.75); |
| Activator:     | 0.1 part by weight of diethanolamine;                                                             |
| Blowing agent: | 0.5 part by weight of trichlorotrifluoroethane.                                                   |

Components A, C and D and activator are mixed, then combined with a mixture of Component B and the blowing agent. The mixture begins to expand in 15 to 45 seconds, thereby producing a rigid polyisocyanate lignin-cellulose foam.

Component C is selected from the following alcohols; methane, ethanol, propanol, isopropanol, butanol, isobutanol, t-butyl alcohol and isomeric pentanols, hexanols, heptanols, cyclohexanol, methylcyclohexanol, methallyl alcohol, furfuryl alcohol, allyl alcohol, cyclohexano-methanol, benzyl alcohol and mixtures thereof.

EXAMPLE 15

| Component A:         | 50 parts by weight of the broken-down alkali metal lignin-cellulose polymer as produced in Example 2b: |
|----------------------|--------------------------------------------------------------------------------------------------------|
| Component B:         | 60 parts by weight of the MDI;                                                                         |
| Component C:         | 4 parts by weight of a phenol compound listed below;                                                   |
| Activator:           | 1 part by weight of triethylamine;                                                                     |
| Blowing agent:       | 10 parts by weight of trichlorotrifluoroethane;                                                        |
| Water-binding agent: | 100 parts by weight of Portland Cement;                                                                |
| Filler:              | 100 parts by weight of plastering sand;                                                                |
| Polyol:              | 20 parts by weight of a surcose amine polyol ("POLY G 71-356" produced by Olin).                       |

The reactants are mixed simultaneously and in 15 to 120 seconds, the mixture begins to expand and produces a rigid polyisocyanate lignin-cellulose concrete product. The expanding mixture may be poured into molds such as a concrete block to produce foamed blocks which harden in about 5 minutes, then may be wet with water to cure the excess cement. These blocks may be used to build walls in houses, are resistant to flames and have excellent insulation properties.

Component C is selected from the following phenols: phenol, cresols, thiophenol, thiocresols and mixtures thereof.

EXAMPLE 16

| | |
|---|---|
| Component A: | A solution containing 50 parts by weight of the broken-down alkali metal lignin-cellulose as produced in Example 2b, 20 parts by weight of acetone (Component C), 30 parts by weight of polyethylene glycol (mol. wt. 480) and 3 parts by weight of triethanolamine; |
| Component B: | 60 parts by weight of crude MDI mixed with 20 parts by weight of TDI and 10 parts by weight of trichlorotrifluoroethane |

Components A and B are mixed thoroughly and the mixture begins to expand in 15 to 60 seconds, thereby producing a rigid polyisocyanate lignin-cellulose foam which may be cut into panels and used for thermal and sound insulation. The foaming mixture may also be poured into hulls of boats and used for floatation.

Other ketones may be used in place of acetone such as methyl ethyl ketone, methyl-isopropyl ketone, methyl-isobutyl ketone, methyl-isoamyl ketone, methyl-n-propyl ketone, methyl-n-butyl ketone, methyl-t-butyl ketone, methyl-furanyl ketone, methyltetrahydro-furfanyl ketone, methyl-heptyl ketone, ethylhexyl ketone, acetophenone, ω-chloroacetophenone, propiophenone and mixtures thereof.

EXAMPLE 17

| | |
|---|---|
| Component A: | 50 parts by weight of the broken-down alkali metal lignin-cellulose polymer as produced in Example 1, mixed with 10 parts by weight of acrylonitrile, 10 parts by weight of nitrobenzene and 30 parts by weight of a surcose amine polyol ("POLY G 71-356" produced by Olin); |
| Component B: | 90 parts by weight of MDI ("PAPI 27" produced by Upjohn) mixed with 20 parts by weight of trichlorotrifluoroethane; |

The compounds are mixed thoroughly and poured in a thin layer to produce a polyisocyanate lignin-cellulose foamed panel which may be used for insulation.

Other nitriles may be used in place of acrylonitrile such as acetonitrile, propionitrile, butyronitrile, tolunitrile, hexahydrobenzonitrile, allylnitrile, methallylnitrile, methacrylonitrile and mixtures thereof.

Other nitro-organic compounds may be used in place of nitrobenzene such as nitromethane, nitroethane, nitrohexane, chlorinated nitrobenzenes, nitrocyclohexanes, brominated nitrobenzenes, benzyl nitrate, nitrotoluene and mixtures thereof.

EXAMPLE 18

| | |
|---|---|
| Component A: | 50 parts by weight of the broken-down alkali metal lignin-cellulose as produced in Example 1; |
| Component B: | 50 parts by weight of TDI; |
| Component C: | 5 parts by weight of benzenesulphonic acid chloride, 5 parts by weight of ethyl acetate and 5 parts by weight of ethyl oxalate; |
| Polyol: | 20 parts by weight of polypropylene glycol (mol. wt. 1200); |
| Component D: | 5 parts by weight of "water glass" (aqueous solution of sodium silicate) containing 10% triethylamine. |

The components are mixed simultaneously and begin to expand in 15 to 45 seconds to produce a semi-rigid polyisocyanate lignin-cellulose foam.

Other sulphonic acids may be used in place of benzenesulphonic acid chloride such as methane sulphonic acid chloride, p-toluene sulphochloride, o-toluene sulphochloride and mixtures thereof.

Other organic acetates may be used in place of ethyloxalate such as methyl acetate, ethyl acetate, propyl acetate, butyl acetate, amyl acetate, the methyl and ethyl esters of propionic, butyric, pentanoic, hexanoic and heptanoic and the corresponding isomeric compounds and mixtures thereof.

EXAMPLE 19

| | |
|---|---|
| Component A: | 50 parts by weight of the broken-down alkali metal lignin-cellulose polymer as produced in Example 2b; |
| Component B: | 60 parts by weight of MDI; |
| Component C: | 5 parts by weight of triethylphosphate, 5 parts by weight of lignin sulfate and 5 parts by weight of phenol methyl ether; |
| Activator: | 2 parts by weight of triethylenediamine; |
| Blowing agent: | 10 parts by weight of trichlorotrifluoroethane; |
| Polyol: | 20 parts by weight of polyethylene glycol (mol. wt. 480). |

The polyol, activator and blowing agent are mixed with Component A, then Components B and C are added and thoroughly mixed. The mixture begins to expand in 15 to 60 seconds, thereby producing a rigid polyisocyanate lignin-cellulose foam.

Other compounds may be used in place of triethylphosphate, such as trimethylphosphite, trimethyl phosphate, triethylphosphate, and mixtures thereof.

Other lignin compounds may be used in place of lignin-sulfate such as calcium lignosulfate, lignosulfonic acid sodium salts, and mixtures thereof.

Although specific materials and conditions were set forth in the above Examples, these were merely illustrative of preferred embodiment of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. A process for producing polyisocyanate lignin-cellulose plastics by the following steps:

(a) mixing Component B, an organic polyisocyanate, or polyisothiocyanate with Component A, a broken-down alkali metal lignin-cellulose polymer;

(b) agitating the mixture at between 20° C. and 60° C. for 10 to 30 minutes, thereby producing a polyisocyanate alkali metal lignin-cellulose prepolymer;

(c) admixing Component C, an organic additive, and, Component D, a curing agent, with the polyisocyanate alkyl metal lignin-cellulose prepolymer and allowing the resultant mixture to react, wherein said organic additive contains 1 to 9 carbon atoms, has a molecular weight of from 32 to 400 and is selected from the group consisting of monoalcohols, monothioalcohols, monophenols, monothiophenols, halomethyl group containing compounds, esters, ethers, thioethers, ketones, nitro-group-containing compounds, monocarboxylic acid chlorides, monocarboxylic acid bromides, monosulphonic acids or salts thereof, monocarboxylic acid or salts thereof, and aldehydes, with the proviso that when said organic additive is a monoalcohol, monothioalcohol, monophenol, monothiophenol or monocarboxylic acid, said mixing of Components C and D into the polyisocyanate silicate prepolymer takes place substantially simultaneously.

2. The process of claim 1 wherein Component C is a compound or radical containing a functional group corresponding to one of the following general formulae: ROH, RSH, RCH$_2$Cl, RCH$_2$I, RCN, RNO$_2$, RCOCl, RCOBr, RSO$_2$Cl, RCOOH, RSO$_3$H, ROR, RCOOR or

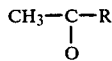

wherein R is CH$_3-$, C$_2$H$_5-$ or C$_2$H$_7-$.

3. The process of claim 1, wherein said organic additive is selected from the group consisting of methanol, ethanol, propanol, isopropanol, butanol, isobutanol, t-butyl alcohol and the isomeric pentanols, hexanols and heptanols, cyclohexanol, methylcyclohexanol, methallyl alcohol, allyl alcohol, cyclohexano-methanol, benzyl alcohol, butylmercaptan, phenol, cresols, thiophenol and thiocresols; formaldehyde, acetaldehyde, propionaldehyde, butyl aldehyde, pentanols, hexanals, heptanals, octanals, and the corresponding semi-acetals and full acetals; formic acid, acetic acid, propionic acid, butyric acid, isobutyric acid, pentanoic acid, hexane carboxylic acid, heptane carboxylic acid, cyclohexane carboxylic acid, benzoic acid, toluic acid; acetyl chloride, propionic acid chloride, acetyl bromide, acid chloride of C$_4$–C$_6$ monocarboxylic acids, methane sulphonic acid chloride, benzenesulphonic acid chloride, p-toluene sulphochloride, o-toluene sulphochloride, carbamic acid chlorides, phenylcarbamic chloride; methyl acetate, ethyl acetate, propyl acetate, butyl acetate, amyl acetate, the methyl and ethyl esters of propionic, butyric, pentanoic, hexanoic and heptanoic and the corresponding isomeric compounds; cyclohexyl methyl ether, methyl butyl ether, phenol methyl ether, thiophenol methyl ether, cresol methyl ether, tetrahydrofuranomethylmethyl ether; ethyl chloride, ethyl bromide, ethyl iodide, n-propyl chloride, n-propyl bromide, n-propyl iodide, isopropyl chloride, isopropyl bromide, isopropyl iodide, butyl chloride, butyl bromide, butyl iodide, benzyl halides, hexahydrobenzyl halides, cyclohexanomethyl chloride, epichlorohydrin, 2-ethyl-2-chloromethyloxetane; methyl ethyl ketone, methyl-isopropyl ketone, methyl-isobutyl ketone, methyl-isoamyl ketone, methyl-n-propyl ketone, methyl-n-butyl ketone, methyl-t-butyl ketone, methyl-furanyl ketone, methyl-tetrahydro-furanyl ketone, methyl-heptyl ketone, ethylhexyl ketone, acetophenone, ω-chloroacetophenone and propiophenone; acetonitrile, propionitrile, butyronitrile, tolunitrile, hexahydrobenzonitrile, acrylonitrile, allylnitrile, methallylnitrile and methacrylonitrile; nitromethane, nitroethane, nitrohexane, nitrobenzene, chlorinated nitrobenzenes, nitrocyclohexanes, brominated nitrobenzenes, benzyl nitrate and nitrotoluene; methanesulphonic acid, ethanesulphonic acid, butanesulphonic acid, benzenesulphonic acid, 2-toluenesulphonic acid, 4-toluenesulphonic acid, chlorosulphonic acid esters and sulphonic acid esters; trimethylphosphite, trimethylphosphate, triethylphosphite and triethylphosphate; calcium lignosulfonate, lignosulfonic acid sodium salts, and lignin sulfate produced by alkali process and mixtures thereof.

4. The process of claim 1 wherein methanol is the organic additive of Component C.

5. The process of claim 1 wherein the components are added in the following ratio:
(a) 2 parts by weight of Component A to from 1 to 10 parts by weight of Component B;
(b) 1% to 30% by weight of Component C, based on weight of Component B;
(c) 1 to 80 parts by weight of Component D to 70 to 80 parts by weight of Component B.

6. The process of claim 1 wherein the polyisocyanate compound is selected from the group consisting of 2,4-toluene diisocyanate, 2-6-toluene diisocyanate, polyphenyl-polymethyleneisocyanates obtained by aniline-formaldehyde condensation followed by phosgenation, modified polyisocyanates which contain carbon diimide groups, urethane groups, allophanate groups, isocyanurate groups, urea groups, imide groups or biuret groups and mixtures thereof.

7. The process of claim 1 wherein Component D is water.

8. The process of claim 1 wherein up to 50% by weight, based on the reaction mixture, of a chemically inert blowing agent, boiling within the range of −25° C. to 80° C., is added.

9. The process of claim 1, wherein the reaction is accompanied by foaming.

10. The process of claim 1, wherein the mixture contains up to 20% by weight, based on the reaction mixture, of a foam stabilizer.

11. The process of claim 1 wherein the mixture contains up to 20% by weight, based on the reaction mixture, of an emulsifying agent.

12. The process of claim 1 wherein inorganic or organic particulate or pulverulent materials are added to the reaction mixture.

13. The product of the process of claim 1.

14. The process of claim 1 wherein the Components A, B, C and D are substantially simultaneously mixed.

15. The process of claim 14.

16. The process of claim 1 wherein an additional step is taken wherein the organic polyisocyanate is reacted with a polyol to produce a liquid isocyanate-terminated polyurethane prepolymer and used as Component B, and the polyol is added in the ratio of 1 to 50 mols to 5 to 99 mols of the polyisocyanate.

17. The process of claim 1 wherein a polyol is added to Component C in the ratio of 1 to 50 mols to 50 to 99 mols of Component B.

18. A polyisocyanate lignin-cellulose plastic, having high strength, elasticity, flame resistance and dimensional stability with increase in temperature, is prepared by the process which comprises substantially simultaneously mixing and reacting an organic polyisocyanate or polyisothiocyanate, a broken-down alkali metal lignin-cellulose polymer selected from the group consisting of broken-down sodium lignin-cellulose polymer and broken-down potassium lignin-cellulose polymer, an organic additive selected from the group consisting of monoalcohols, monothioalcohols, monophenols, and monothiophenols, said organic additive having a molecular weight of up to about 400, an activator selected from the group consisting of tertiary amines and organo-tin compounds, and a curing agent selected from the group consisting of water, and water containing an alkali metal silicate, said polyisocyanate lignin-cellulose plastic being the solid product.

19. The process of claim 1 wherein the mixture contains from 0.001% to 10% by weight based on the reaction mixture of an activator selected from the group consisting of tertiary amines, organo-tin compounds and silaamines.

20. The process of claim 1 wherein the organic polyisocyanate is selected from the group consisting of arylene polyisocyanates, alkylene polyisocyanates, phosgenation products of aniline-formaldehyde condensation and mixtures thereof.

* * * * *